United States Patent
Li et al.

(10) Patent No.: US 10,509,254 B2
(45) Date of Patent: Dec. 17, 2019

(54) METHOD FOR MANUFACTURING DISPLAY SUBSTRATE, DISPLAY SUBSTRATE, DISPLAY PANEL AND DISPLAY APPARATUS

(71) Applicants: BOE Technology Group Co., Ltd., Beijing (CN); Chengdu BOE Optoelectronics Technology Co., Ltd., Chengdu (CN)

(72) Inventors: Danhui Li, Beijing (CN); Qingde Long, Beijing (CN); Zerong Yang, Beijing (CN); Chao Ye, Beijing (CN); Changyu Fu, Beijing (CN); Xiaojiao Xiong, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 142 days.

(21) Appl. No.: 15/793,115

(22) Filed: Oct. 25, 2017

(65) Prior Publication Data
US 2018/0267352 A1 Sep. 20, 2018

(30) Foreign Application Priority Data
Mar. 14, 2017 (CN) .......................... 2017 1 0151735

(51) Int. Cl.
*G02F 1/1335* (2006.01)
*G02F 1/1333* (2006.01)

(52) U.S. Cl.
CPC .. *G02F 1/133512* (2013.01); *G02F 1/133514* (2013.01); *G02F 2001/133354* (2013.01)

(58) Field of Classification Search
CPC ......... G02F 1/133512; G02F 1/133514; G02F 2001/133354
See application file for complete search history.

(56) References Cited

U.S. PATENT DOCUMENTS 6,320,639 B1 * 11/2001 Mori ................. G02F 1/133514
349/155
8,592,111 B2 11/2013 Zhang
(Continued)

FOREIGN PATENT DOCUMENTS

CN 102096328 A 6/2011
CN 103293740 A 9/2013
(Continued)

OTHER PUBLICATIONS

First Office Action, including Search Report, for Chinese Patent Application No. 201710151735.8, dated Feb. 18, 2019, 19 pages.

*Primary Examiner* — Dung T Nguyen
(74) *Attorney, Agent, or Firm* — Westman, Champlin & Koehler, P.A.

(57) ABSTRACT

The present disclosure discloses a method for manufacturing a display substrate, a display substrate, a display panel and a display apparatus. The method comprises: forming a black matrix and a plurality of black matrix alignment marks; providing a color film mask having a plurality of color film layer alignment marks associated with the black matrix alignment marks; and forming the color film layer on the black matrix by aligning the black matrix alignment marks with the associated color film layer alignment marks respectively, wherein the black matrix has a group of N first black matrix alignment marks and a group of N second black matrix alignment marks formed on ends of opposing edges thereof, respectively, and a spacing between adjacent first black matrix alignment marks different from that between adjacent second black matrix alignment marks.

20 Claims, 16 Drawing Sheets

(56) References Cited

U.S. PATENT DOCUMENTS

| | | | |
|---|---|---|---|
| 8,758,964 B2 | 6/2014 | Zhang | |
| 9,547,110 B2* | 1/2017 | Wang | G02B 5/201 |
| 9,891,464 B2 | 2/2018 | Xiong | |
| 2012/0141926 A1 | 6/2012 | Zhang | |
| 2014/0045104 A1 | 2/2014 | Zhang | |
| 2017/0115526 A1 | 4/2017 | Xiong | |
| 2018/0275458 A1* | 9/2018 | Lin | G02F 1/133516 |
| 2018/0373074 A1* | 12/2018 | Li | G02F 1/13394 |
| 2019/0101673 A1* | 4/2019 | Yao | G02F 1/13 |

FOREIGN PATENT DOCUMENTS

| | | |
|---|---|---|
| CN | 103969873 A | 8/2014 |
| CN | 104808434 A | 7/2015 |
| CN | 105182680 A | 12/2015 |
| JP | S61219901 A | 9/1986 |
| JP | H04333018 A | 11/1992 |
| JP | 2007256581 A | 10/2007 |

* cited by examiner

METHOD FOR MANUFACTURING DISPLAY SUBSTRATE, DISPLAY SUBSTRATE, DISPLAY PANEL AND DISPLAY APPARATUS

TECHNICAL FIELD

The embodiments of the present disclosure relate to the field of display, and more particularly, to a method for manufacturing a display substrate, a display substrate, a display panel and a display apparatus.

BACKGROUND

In the field of liquid crystal display, a display substrate is an important part of a display panel for achieving color display. In the conventional manufacturing process of a display substrate, a black matrix is usually formed on a transparent substrate such as glass, and a color film layer is formed on the substrate that already has the black matrix formed thereon. Exposure→Development process is an important process during manufacturing of the color film layer, and it is usually performed using an exposure device, where the exposure device automatically detects a pre-set exposure alignment mark in real time and aligns a mask plate having a pattern of the color film layer with the alignment mark. Specifically, the conventional alignment process may comprise aligning the transparent substrate with a stage of the exposure device and forming a black matrix and black matrix alignment marks; aligning the substrate on which the black matrix is formed with the stage of the exposure device; and aligning the black matrix with a mask for the color film layer, wherein the alignment of the black matrix with the mask for the color film layer is achieved by aligning the black matrix alignment marks with the color film layer alignment marks.

However, when there is just a spacing offset of an integral number of alignment marks between the black matrix alignment marks and associated color film layer alignment marks, the alignment may be considered by the exposure device as having no alignment error, which thus results in misjudgment.

SUMMARY

At least one embodiment of the present disclosure provides a method for manufacturing a display substrate, a display substrate, a display panel and a display apparatus, to overcome or alleviate the above technical problems.

According to an aspect of the present disclosure, there is provided a method for manufacturing a display substrate, comprising:

forming a black matrix and a plurality of black matrix alignment marks;

providing a color film mask having a plurality of color film layer alignment marks which are associated with the plurality of black matrix alignment marks respectively; and forming the color film layer on the black matrix by aligning the black matrix alignment marks with the associated color film layer alignment marks respectively, wherein each end of an edge on one side of the black matrix has a group of N first black matrix alignment marks formed thereon, and a spacing between adjacent first black matrix alignment marks is a first spacing; and each end of an edge on the opposing side of the black matrix has a group of N second black matrix alignment marks formed thereon, and a spacing between adjacent second black matrix alignment marks is a second spacing different from the first spacing, where N is an integer greater than 1.

In an example, a center of each group of first black matrix alignment marks is located in a first line, a center of each group of second black matrix alignment marks is located in a second line, and the second spacing is equal to the first spacing plus nx3P, where n is a positive integer, and P is a spacing between central lines of adjacent sub-pixels.

In an example, a spacing between adjacent first color film layer alignment marks is the first spacing plus P or the first spacing minus P; and a spacing between adjacent second color film layer alignment marks is the second spacing plus P or the second spacing minus P.

In an example, a spacing between adjacent first color film layer alignment marks in a direction of the first line is the first spacing, and a spacing between adjacent first color film layer alignment marks in a direction perpendicular to the first line is P; and a spacing between adjacent second color film layer alignment marks in the direction of the first line is the second spacing, and a spacing between adjacent second color film layer alignment marks in the direction perpendicular to the first line is P.

In an example, the first spacing is equal to 1.5 mm, and 0.4 mm<nx3P<1.1 mm.

According to another aspect of the present disclosure, there is provided a display substrate, comprising:

a black matrix having a plurality of black matrix alignment marks arranged thereon; and a color film layer formed on the black matrix by aligning the black matrix alignment marks with associated color film layer alignment marks on a color film mask respectively, wherein each end of an edge on one side of the black matrix has a group of N first black matrix alignment marks arranged thereon, and a spacing between adjacent first black matrix alignment marks is a first spacing; and each end of an edge on the opposing side of the black matrix has a group of N second black matrix alignment marks arranged thereon, and a spacing between adjacent second black matrix alignment marks is a second spacing different from the first spacing, where N is an integer greater than 1.

According to another aspect of the present disclosure, there is provided a display panel, comprising an array substrate and the display substrate according to the embodiments of the present disclosure.

According to another aspect of the present disclosure, there is provided a display apparatus, comprising the display panel according to the embodiments of the present disclosure.

BRIEF DESCRIPTION OF THE DRAWINGS

In order to more clearly illustrate the technical solutions in the embodiments of the present disclosure or in the prior art, the following accompanying drawings, which are intended to be used in the description of the embodiments, are briefly described. It will be apparent that the accompanying drawings described in the following description are merely some embodiments of the present disclosure, and other accompanying drawings can be obtained by those of ordinary skill in the art according to these accompanying drawings without contributing any creative labor. In the accompanying drawings.

DETAILED DESCRIPTION

In order to make the purposes, technical solutions and advantages of the embodiments of the present disclosure more clear, the technical solutions in the embodiments of the present disclosure will be clearly and completely described below in conjunction with the accompanying drawings in the embodiments of the present disclosure. Obviously, the embodiments described are a part of the embodiments of the present disclosure instead of all the embodiments. All other embodiments obtained by those of ordinary skill in the art based on the described embodiments of the present disclosure without contributing any creative work are within the protection scope of the present disclosure. It should be noted that throughout the accompanying drawings, the same elements are represented by the same or similar reference signs. In the following description, some specific embodiments are for illustrative purposes only and are not to be construed as limiting the present disclosure, but merely examples of the embodiments of the present disclosure. The conventional structure or construction will be omitted when it may cause confusion with the understanding of the present disclosure. It should be noted that shapes and dimensions of components in the figures do not reflect true sizes and proportions, but only illustrate contents of the embodiments of the present disclosure.

Unless otherwise defined, technical terms or scientific terms used in the embodiments of the present disclosure should be of ordinary meanings to those skilled in the art. "First", "second" and similar words used in the embodiments of the present disclosure do not represent any order, quantity or importance, but are merely used to distinguish between different constituent parts.

In addition, in the accompanying drawings of the embodiments of the present disclosure, only the structures referred to in the embodiments of the present disclosure are concerned, and other structures may be referred to the conventional design. In addition, it will be understood that when an element such as a layer, a film, a region or a substrate etc. is referred to as being located "on" or "below" another element, the element may be "directly" located "on" or "below" the other element, or there may also be an intermediate element therebetween. In addition, "on" or "below" only represents a relative positional relationship, and the "on" or "below" relationship may change accordingly when the element or the entire device is turned over. The present disclosure will be described using a relative positional relationship in which a substrate is used as an underlying layer.

Figure 1A:
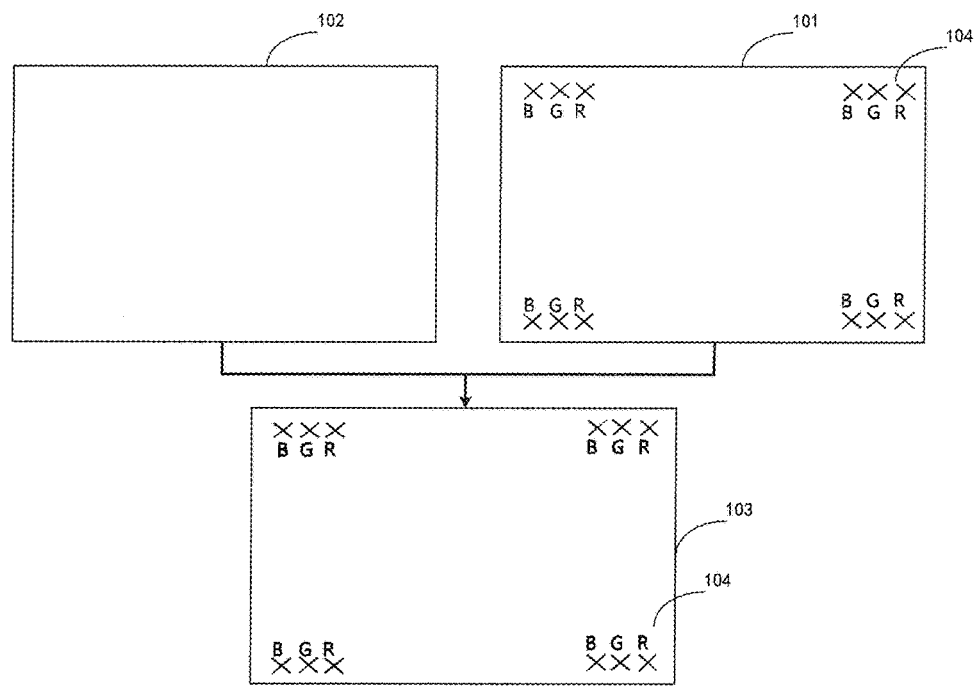
FIG. 1A illustrates a conventional diagram of formation of black matrix alignment marks.
Figure 1B:
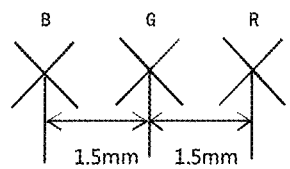
FIG. 1B illustrates a detailed diagram of the black matrix alignment marks in FIG. 1A.

During manufacturing of the display substrate, the transparent substrate is usually cleaned and a black matrix is formed on the transparent substrate to prevent light leakage from various color film layers such as a first color film layer (for example, red), a second color film layer (for example, green), a third color film layer (for example, blue) etc. FIG. 1A illustrates a conventional diagram of formation of a black matrix and black matrix alignment marks. As shown in FIG. 1A, a pattern of the black matrix is formed on the transparent substrate 102 using a mask 101 for the black matrix to obtain a substrate 103 having the black matrix formed thereon. At the same time, four corners of the mask 101 for the black matrix have four groups of black matrix alignment marks 104 provided thereon, so that corresponding black matrix alignment marks 104 are formed on the substrate 103. In FIG. 1A, the black matrix alignment marks 104 are shown by cross-shaped marks, and all of the red (R) layer, the green (G) layer and the blue (R) layer have respective alignment marks which are the same in shape. FIG. 1B illustrates a detailed diagram of a group of black matrix alignment marks in FIG. 1A. As shown in FIG. 1B, four groups of black matrix alignment marks are the same in shape and arrangement, and adjacent alignment marks in each group of black matrix alignment marks is spaced by, for example, 1.5 mm.

Figure 2:
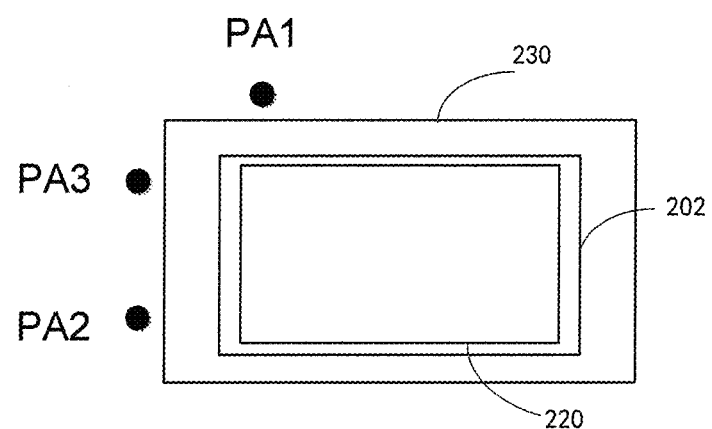
FIG. 2 illustrates a diagram of monitoring of initial alignment of a transparent substrate using sensors.

When the black matrix is formed, it needs to align the transparent substrate with the stage of the exposure device, which may be referred to as initial alignment of the transparent substrate. When the transparent substrate is initially aligned using the exposure device, it may be monitored by, for example, three sensors. FIG. 2 illustrates a diagram of monitoring of the initial alignment of the transparent substrate using sensors. As shown in FIG. 2, for example, three sensors PA1, PA2 and PA3 monitor edges of the transparent substrate 202, respectively. When an offset of a position of the transparent substrate 202 on the stage 230 exceeds or does not reach a monitored area of a corresponding sensor, the device may raise an alarm. However, in the practical manufacturing, due to limitation of the sensitivity of the sensor and interference of the photoresist on the sensor, it may lead to misjudgment of the sensor. For example, when there is an offset between the transparent substrate 202 and the stage 230, the device may consider an adhesive edge 220 of the photoresist as an edge of the transparent substrate 202, and erroneously considers that the transparent substrate 202 is properly aligned with the stage 230. If the offset of the transparent substrate is exactly 1 or 2 times of the spacing between the black matrix alignment marks (±0.2 mm), for example, in a range of 1.3 mm to 1.7 mm or 2.8 mm to 3.2 mm, it may cause an adverse effect on the manufacturing of the color film layer.

Figure 3:
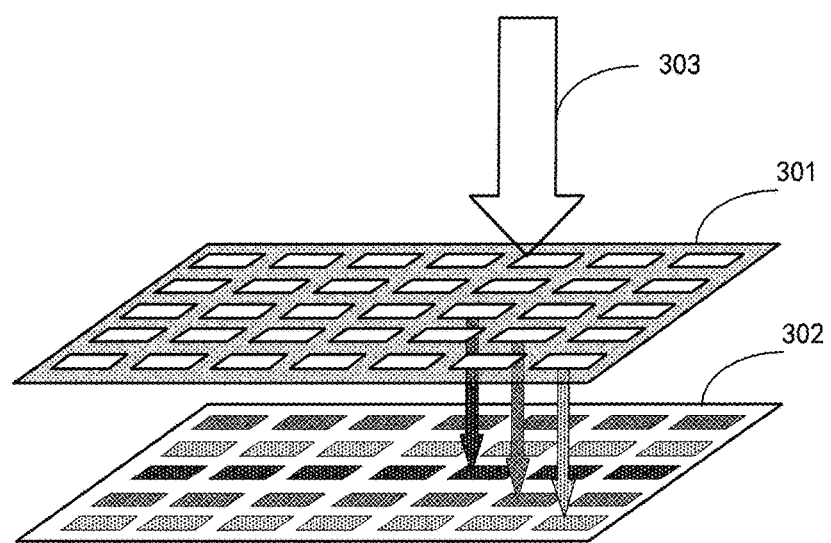
FIG. 3 illustrates a diagram of formation of a color film layer on a black matrix.

The manufacturing of the color film layer may comprise cleaning→coating photoresist with a corresponding color-→pre-curing→exposing→developing→curing. A negative glue may be used as the photoresist of the color film layer, so that after the exposing→developing process, an exposed portion is retained and is cured by, for example, baking to form the color film layer. FIG. 3 illustrates a diagram of formation of a color film layer on a black matrix. The mask 301 for the black matrix is formed with a pattern of the black matrix, which allows a portion of light 303 indicated by a large arrow to pass and block the remaining portion of the light. A pattern corresponding to a mask for the color film layer, i.e., a pattern for the color film layer 302, is formed by the light which passes through an opening of the black matrix. In FIG. 3, different textures correspond to light in different colors.

Figure 4A:
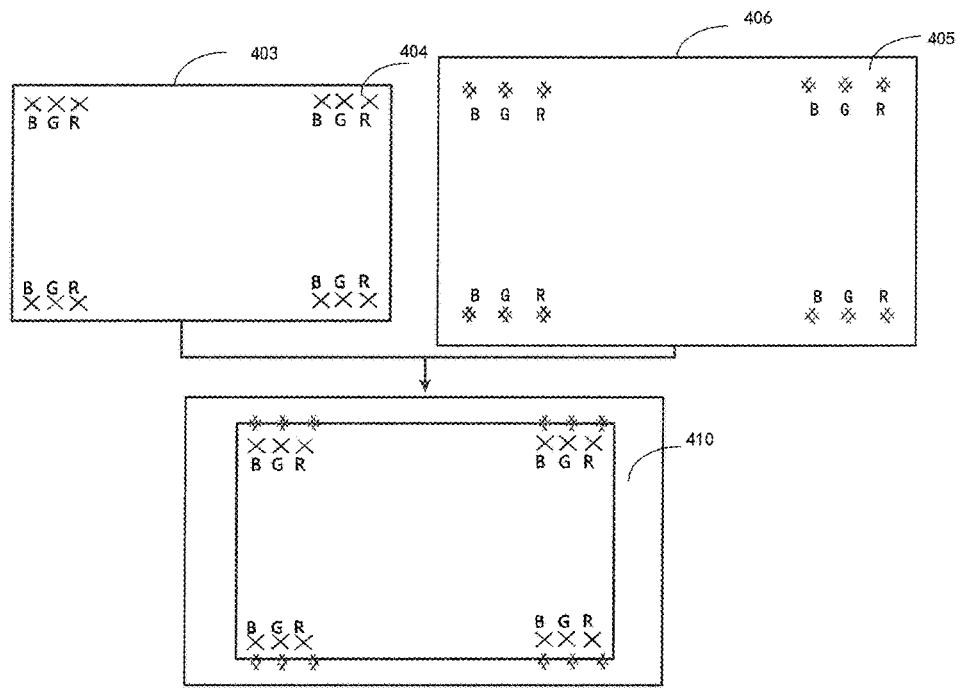
FIG. 4A illustrates a conventional diagram of alignment of a mask for a color film layer and a black matrix.
Figure 4B:
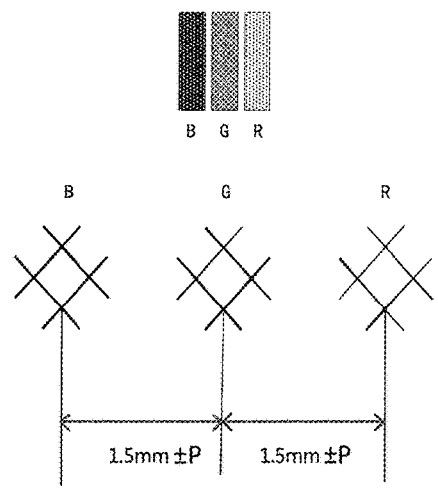
FIG. 4B illustrates a detailed diagram of a group of color film layer alignment marks in FIG. 4A when sub-pixels are sequentially arranged in a lateral direction.
Figure 4C:
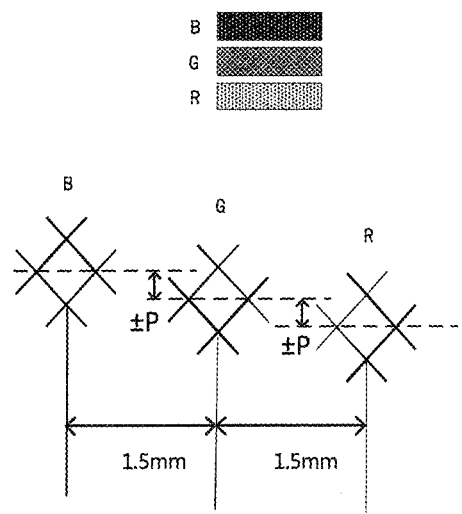
FIG. 4C illustrates a detailed diagram of a group of color film layer alignment marks in FIG. 4A when sub-pixels are sequentially arranged in a longitudinal direction.

FIG. 4A illustrate a diagram of conventional alignment of a mask for a color film layer with a black matrix. As shown in FIG. 4A, the mask 406 for the color film layer is aligned with a substrate 403 on which a black matrix is formed, and a display substrate 410 is formed based on the alignment. For example, four groups of cross-shaped alignment marks 404 are formed on the substrate 403, and corresponding four groups of alignment marks 405 of the color film layer are provided on the mask 406 for the color film layer. In FIG. 4A, the alignment marks 405 of the color film layer are shown as #-shaped marks, and an alignment mark is provided for each of red (R), green (G) and blue (R). FIG. 4B illustrates a detailed diagram of a group of color film layer alignment marks in FIG. 4A when sub-pixels are sequentially arranged in a lateral direction. As shown in FIG. 4B, when the sub-pixels are sequentially arranged in the lateral direction, adjacent alignment marks in various #-shaped color film layer alignment marks are spaced by 1.5 mm±P in the lateral direction and by 0 in a longitudinal direction. FIG. 4C illustrates a detailed diagram of a group of color film layer alignment marks in FIG. 4A when sub-pixels are sequentially arranged in a longitudinal direction. As shown in FIG. 4C, when the sub-pixels are sequentially arranged in the longitudinal direction, adjacent alignment marks in various #-shaped color film layer alignment marks are spaced by 1.5 mm in a lateral direction and by a spacing P between central lines of adjacent sub-pixels in the longitudinal direction. In practice, the spacing P may be approximately the width of a sub-pixel, i.e., the thickness of the color film layer, also referred to as the Critical Dimension (CD) line width.

Figure 5A:
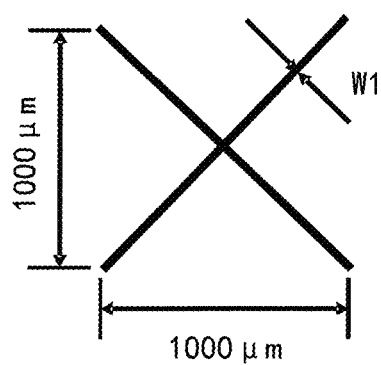
FIG. 5A illustrates an exemplary diagram of black matrix alignment marks.
Figure 5B:
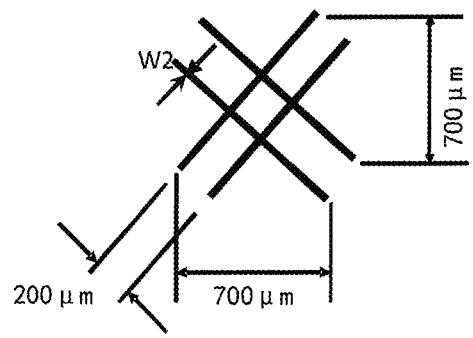
FIG. 5B illustrates an exemplary diagram of color film layer alignment marks.

FIG. 5A illustrates an exemplary diagram of black matrix alignment marks. As shown in FIG. 5A, a single black matrix alignment mark has a line width of W1, and a size of, for example, 1000 μm×1000 μm. FIG. 5B illustrates an exemplary diagram of color film layer alignment marks. As shown in FIG. 5B, a single alignment mark of the color film has a line width of W2, which is generally less than W1. The alignment mark of the color film layer may have a size of, for example, 700 μm×700 μm, and a line spacing of, for example, 200 μm.

When the mask for the color film layer is aligned with the substrate on which the black matrix is formed, the color film layer alignment marks are aligned with the black matrix alignment marks. For example, the alignment may be performed using, for example, a proximity exposure device. Specifically, when alignment is performed using the proximity exposure device, four groups of alignment marks are monitored by, for example, four Charge Coupled Device (CCD) lenses and an alignment situation is displayed on the display device to ensure that the color film layer alignment marks are aligned with the black matrix alignment marks. If no alignment is found, the device raises an alarm. In this case, the mask for the color film layer remains fixed, and the substrate on which the black matrix is formed is moved by moving the stage of the exposure device so that the color film layer alignment marks are aligned with the black matrix alignment marks.

Figure 6A:
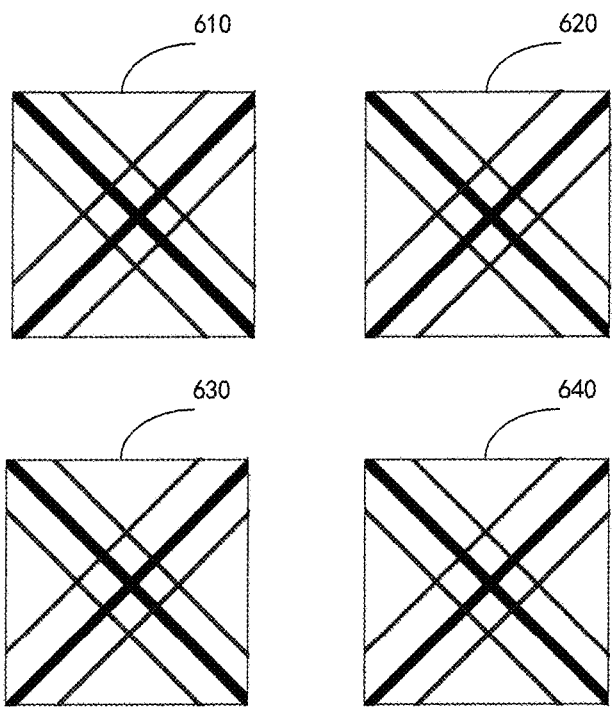
FIG. 6A illustrates a display example in which color film layer alignment marks are aligned with black matrix alignment marks.
Figure 7A:
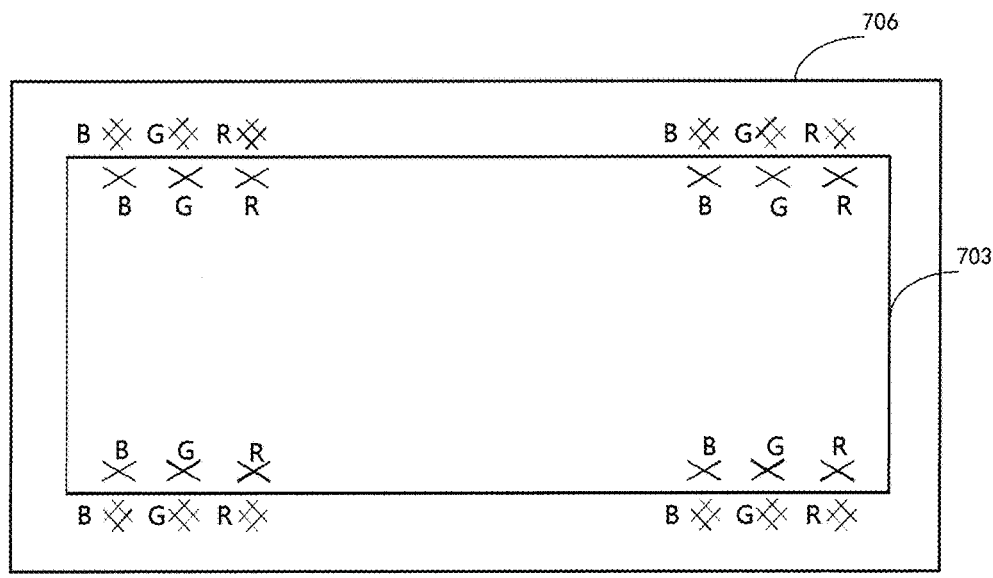
FIG. 7A illustrates a diagram showing a case in which color film layer alignment marks are aligned with black matrix alignment marks.

FIG. 6A illustrates a display example in which color film layer alignment marks are aligned with black matrix alignment marks, wherein, for example, by taking alignment marks for red (R) sub-pixels as an example, pictures 610, 620, 630 and 640 respectively show cases in which four R color film layer alignment marks at four corners of a mask for the color film layer are aligned with four R black matrix alignment marks. FIG. 7A illustrates a diagram showing a case in which color film layer alignment marks are aligned with black matrix alignment marks. In FIG. 7A, by taking sub-pixels being sequentially arranged in a lateral direction as an example, the color film layer alignment marks on a mask 706 for the color film layer are aligned with black matrix alignment marks formed on a substrate 703. Sub-pixels B, G, and R, which are sequentially arranged in the lateral direction, may be formed based on the alignment of marks shown in FIG. 7A.

Figure 6B:
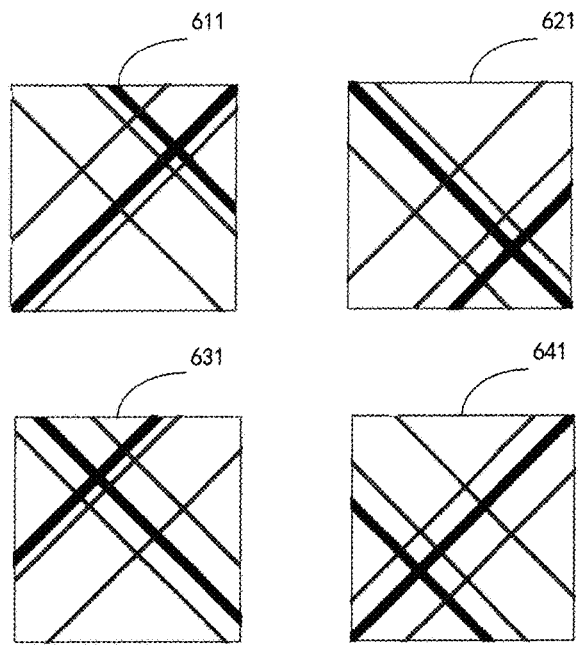
FIG. 6B illustrates a display example in which color film layer alignment marks are not aligned with black matrix alignment marks.
Figure 7B:
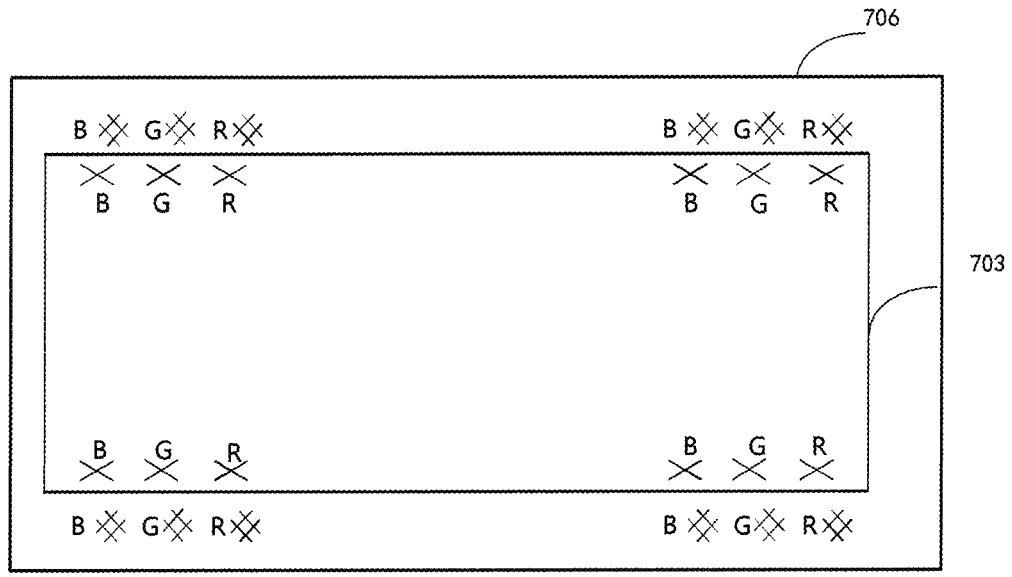
FIG. 7B illustrates a first exemplary diagram showing a case in which color film layer alignment marks are not aligned with black matrix alignment marks.

There may be two cases in which color film layer alignment marks are not aligned with black matrix alignment marks. In a first case, the color film layer alignment marks are not aligned with the black matrix alignment marks and a device raises an alarm. This may also comprise two situations. FIG. 6B illustrates a display example of a first situation in which the color film layer alignment marks are not aligned with the black matrix alignment marks, wherein, for example, by taking alignment marks for red (R) sub-pixels as an example, pictures 611, 621, 631 and 641 respectively show cases in which four R color film layer alignment marks at four corners of a mask for the color film layer are not aligned with four R black matrix alignment marks. In the situation shown in FIG. 6B, an operator can manually correct an error of the alignment so that the subsequent process can proceed normally. FIG. 7B illustrates a diagram for this situation, wherein the same parts as those in FIG. 7A are not repeated for simplicity. After the error of the alignment is corrected, the correct alignment can still be achieved in a case that initial alignment is as shown in FIG. 7B. In a second situation, an offset of the color film layer alignment marks relative to the black matrix alignment marks exceeds a recognition range of the device and the device raises an alarm. However, only the color film layer alignment marks may be displayed, and therefore when an operator needs to manually correct an error of the alignment, there may be misleading for the operator, which will result in erroneous alignment.

Figure 7C:
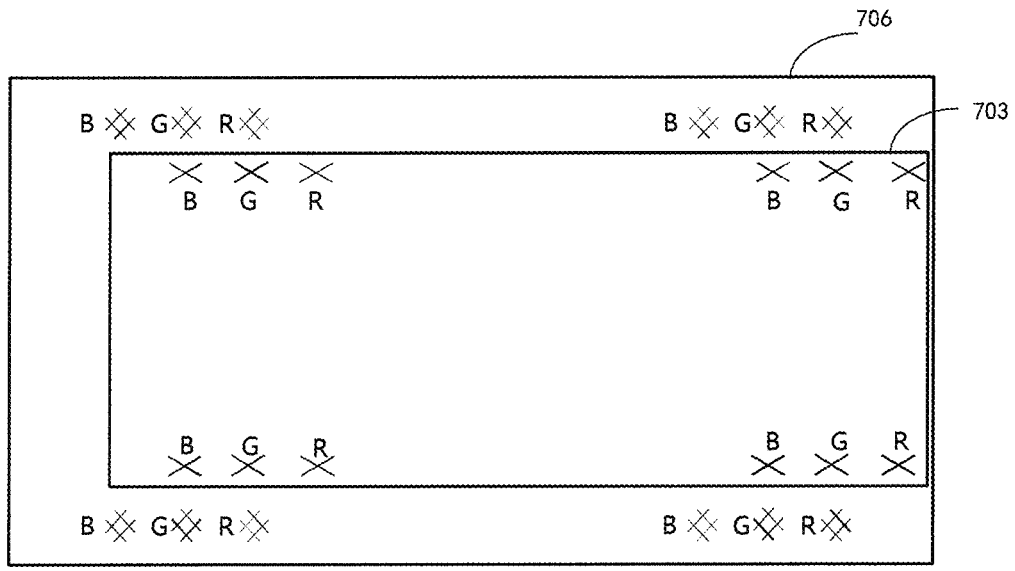
FIG. 7C illustrates a second exemplary diagram showing a case in which color film layer alignment marks are not aligned with black matrix alignment marks.

In the second case, the color film layer alignment marks are not aligned with the black matrix alignment marks but the device does not raise an alarm. For example, in the case described above with reference to FIG. 2, if the offset of the transparent substrate is exactly one or two times the spacing of black matrix alignment marks in the process of initial alignment of the transparent substrate, the alignment offset cannot be discovered by the sensor. In this case, the pattern of the black matrix formed on the transparent substrate and the black matrix alignment marks also have an overall offset relative to normal positions. As the black matrix alignment marks have an overall offset of, for example, one or two alignment marks, the black matrix alignment marks do not correspond to the color film layer alignment marks. FIG. 7C illustrates a diagram in this case, wherein the same parts as those in FIG. 7A are not repeated.

Figure 7D:
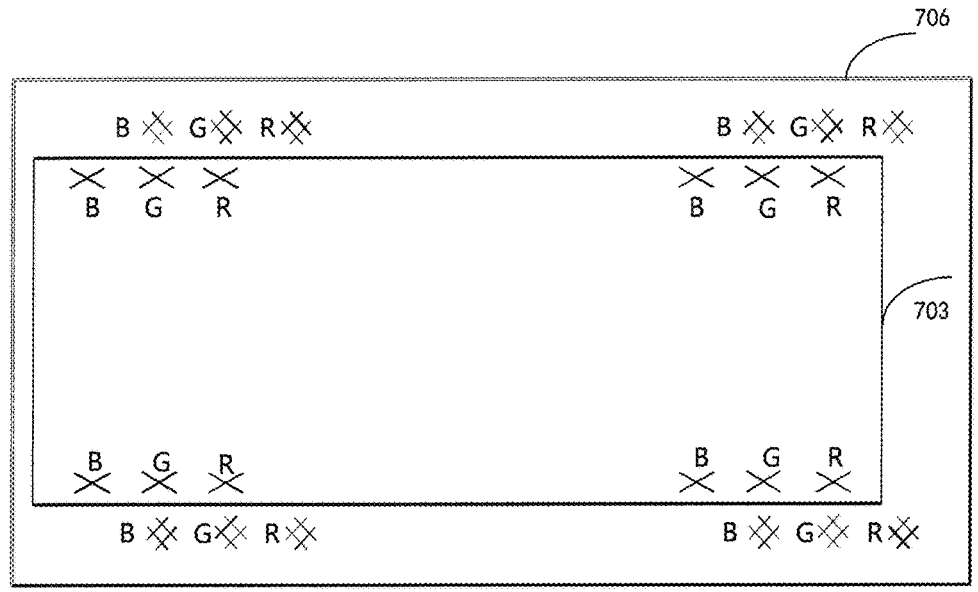
FIG. 7D illustrates a third exemplary diagram showing a case in which color film layer alignment marks are not aligned with black matrix alignment marks.
Figure 7E:
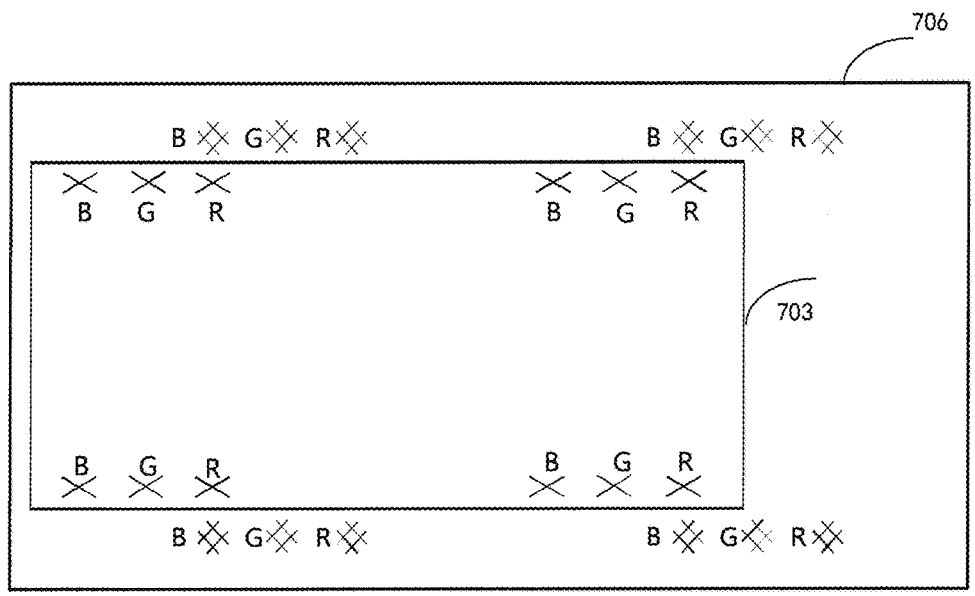
FIG. 7E illustrates a fourth exemplary diagram showing a case in which color film layer alignment marks are not aligned with black matrix alignment marks.

In addition, even if positions of the black matrix alignment marks are correct, the color film layer alignment marks may have an overall offset of, for example, one or two alignment marks relative to the black matrix alignment marks alignment mark. FIG. 7D illustrates a diagram of overall offset of one alignment mark. FIG. 7E shows a schematic diagram of the overall offset of two alignment marks. In the case of FIGS. 7C to 7E, the device does not alarm due to the overall offset of, for example, one or two alignment marks, and may display a picture similar to FIG. 6A. The device may erroneously consider that the black matrix alignment marks exactly correspond to the color film layer alignment marks, and align the corresponding positions as reference positions for subsequent alignment. This operation may lead to complete erroneous alignment subsequently. Due to the erroneous alignment, corresponding sub-pixels cannot be formed in correct positions when the color film layer is formed.

To this end, according to an embodiment of the present disclosure, there is provided a method for manufacturing a display substrate. It should be noted that sequence numbers of steps in the following method are used only as a representation of the steps for description and should not be considered as an order of execution of the respective steps. Unless otherwise stated, the method does not need to be performed in exactly the order shown.

Figure 8:
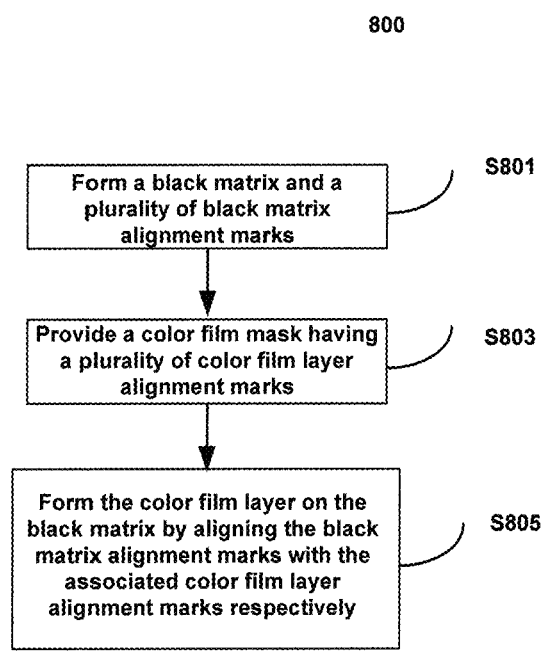
FIG. 8 illustrates a schematic flowchart of a method for manufacturing a display substrate according to an embodiment of the present disclosure.

FIG. 8 illustrates a schematic flowchart of a method for manufacturing a display substrate according to an embodiment of the present disclosure. As shown in FIG. 8, the method 800 for manufacturing a display substrate according to a first embodiment of the present disclosure may comprise the following steps.

In step 801, a black matrix and a plurality of black matrix alignment marks are formed.

In step 803, a color film mask having a plurality of color film layer alignment marks is provided, wherein plurality of color film layer alignment marks are associated with the plurality of black matrix alignment marks respectively.

In step 805, the color film layer is formed on the black matrix by aligning the black matrix alignment marks with the associated color film layer alignment marks respectively.

Next, the method for manufacturing a display substrate according to an embodiment of the present disclosure will be described in detail in conjunction with FIGS. 8 and 9A-9C.

Figure 9A:
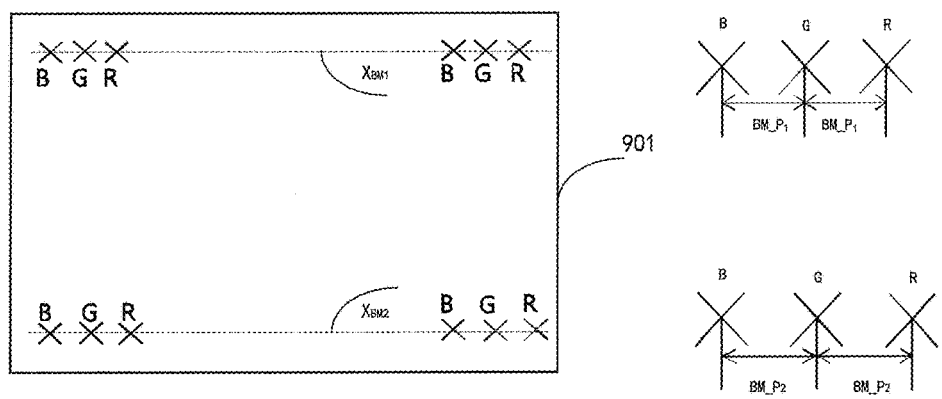
FIG. 9A illustrates a diagram of setting of black matrix alignment marks according to an embodiment of the present disclosure.

In step 801, a black matrix and a plurality of black matrix alignment marks are formed. Specifically, each end of an edge on one side of the black matrix has a group of N first black matrix alignment marks $BM_{11}$-$BM_{1N}$ formed thereon, and a spacing between adjacent first black matrix alignment marks is a first spacing $BM\_P_1$; and each end of an edge on the opposing side of the black matrix has a group of N second black matrix alignment marks $BM_{21}$-$BM_{2N}$ formed thereon, and a spacing between adjacent second black matrix alignment marks is a second spacing $BM\_P_2$ that is different from the first spacing $BM\_P_1$. In FIG. 9A, N being equal to 3 is taken as an example for description; however those skilled in the art will appreciate that N may be any integer greater than 1. In addition, for example, black matrix alignment marks formed at the edge on one side the black matrix may be formed outside the black matrix.

For example, a center of each group of N first black matrix alignment marks (for example, $BM_{11}$-$BM_{1N}$) is located in a first line $X_{BM1}$, a center of each group of N second black matrix alignment marks (for example, $BM_{21}$-$BM_{2N}$) is located in a second line $X_{BM2}$, and the second spacing is equal to the first spacing plus n×3P, i.e. $BM\_P_2 = BM\_P_1 + n×3P$, where n is a positive integer, and P is a spacing between central lines of adjacent sub-pixels. In practical applications, P may be approximated as a width of a sub-pixel.

For example, the first spacing may be equal to 1.5 mm, and 0.4 mm<n×3P<1.1 mm. That is, the second spacing $BM\_P_2$ is between 1.9 mm and 2.6 mm. In practical applications, for example, a light transmission hole of the exposure device is 10 mm, and therefore an overall size of the entire group of alignment marks should be less than 10 mm and a diameter of a display area of the alignment marks is 0.4 mm. If it is ensured that 0.4 mm<n×3P<1.1 mm, it can implement the embodiments of the present disclosure better.

In step 803, a color film mask having a plurality of color film layer alignment marks is provided, wherein plurality of color film layer alignment marks are associated with the plurality of black matrix alignment marks respectively. Specifically, a group of N first color film layer alignment marks $CF_{11}$-$CF_{1N}$ are associated with the group of N first black matrix alignment marks $BM_{11}$-$BM_{1N}$, and a group of N second color film layer alignment marks $CF_{21}$-$CF_{2N}$ are associated with the group of N second black matrix alignment marks $BM_{21}$-$BM_{2N}$.

Figure 9B:
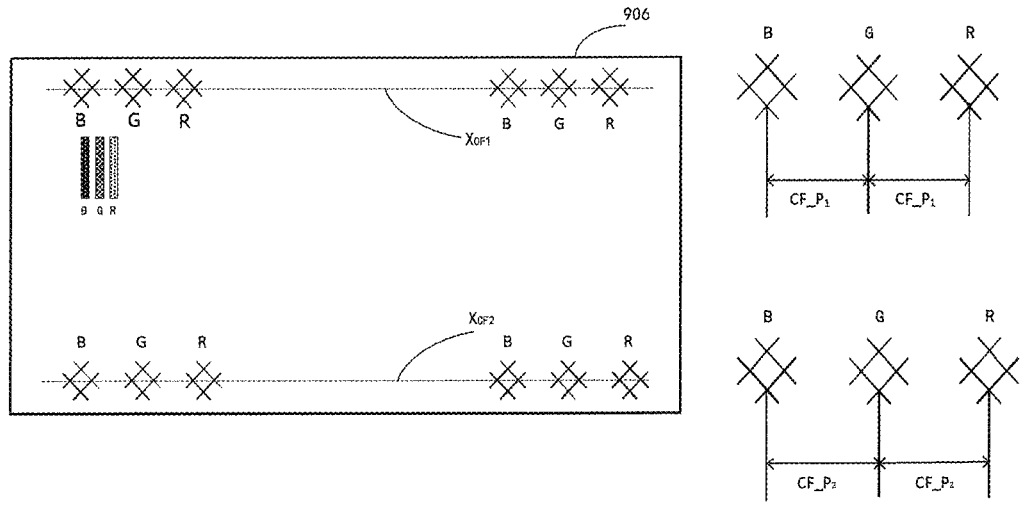
FIG. 9B illustrates a diagram of setting of first exemplary color film layer alignment marks according to an embodiment of the present disclosure.

FIG. 9B illustrates a first example of positions of color film layer alignment marks according to an embodiment of the present disclosure. FIG. 9B illustrates an example showing a case in which sub-pixels on a mask 906 for a color film layer are sequentially arranged in a lateral direction of a display array. As shown in FIG. 9B, a center of N first color film layer alignment marks which are associated with N first black matrix alignment marks $BM_{11}$-$BM_{1N}$ is located in a third line $X_{CF1}$, and a spacing CF_$P_1$ between adjacent alignment marks of the N first color film layer alignment marks $CF_{11}$-$CF_{1N}$ is the first spacing ±P, i.e., CF_$P_1$=(BM_$P_1$+P) or CF_$P_1$=(BM_$P_1$−P). In addition, a spacing CF_$P_2$ between adjacent alignment marks of N second color film layer alignment marks $CF_{21}$-$CF_{2N}$ is the second spacing ±P, i.e., CF_$P_2$=(BM_$P_2$+P) or CF_$P_2$=(BM_$P_2$−P). A center of the N second color film layer alignment marks $CF_{21}$-$CF_{2N}$ may be located in a fourth line $X_{CF2}$. The first line $X_{BM1}$, the second line $X_{BM2}$, the third line $X_{CF1}$ and the fourth line $X_{CF2}$ may be parallel to each other.

For example, in a case that the first spacing BM_$P_1$ shown in FIG. 9A is equal to 1.5 mm, CF_$P_1$=(BM_$P_1$+P)=1.5 mm+P or CF_$P_1$=(BM_$P_1$−P)=1.5 mm−P; and CF_$P_2$=(BM_$P_2$+P)=1.5 mm+(n×3+1)P or CF_$P_2$=(BM_$P_2$−P)=1.5 mm+(n×3−1)P. Similarly, if it is ensured that 0.4 mm<n×3P<1.1 mm, it can implement the embodiments of the present disclosure better.

Figure 9C:
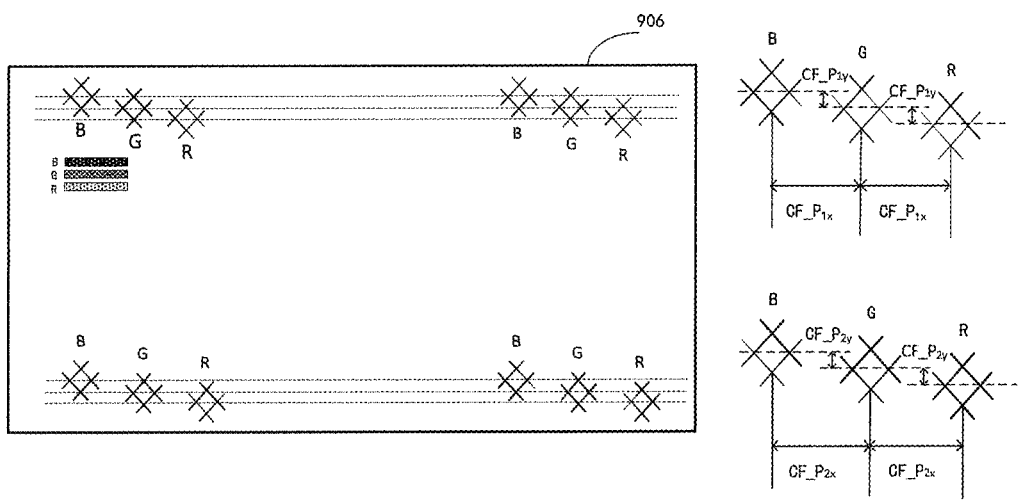
FIG. 9C illustrates a diagram of setting of second exemplary color film layer alignment marks according to an embodiment of the present disclosure.

FIG. 9C illustrates a second example of positions of color film layer alignment marks according to an embodiment of the present disclosure. FIG. 9C illustrates an example showing a case in which sub-pixels on a mask 906 for a color film layer are sequentially arranged in a longitudinal direction of a display array. As shown in FIG. 9C, a spacing CF_$P_{1x}$ between adjacent alignment marks of N first the color film layer alignment marks $CF_{11}$-$CF_{1N}$ of in an extension direction along a first line $X_{BM1}$ is the first spacing BM_$P_1$, and a spacing CF_$P_{1y}$ between adjacent alignment marks of the N first color film layer alignment marks $CF_{11}$-$CF_{1N}$ in a direction perpendicular to the first line $X_{BM1}$ is P, wherein, the N first color film layer alignment marks $CF_{11}$-$CF_{1N}$ are associated with N first black matrix alignment marks $BM_{11}$-$BM_{1N}$. A spacing CF_$P_{2x}$ between adjacent alignment marks of N second color film layer alignment marks $CF_{21}$-$CF_{2N}$ in an extension direction along the first line $X_{BM1}$, is the second spacing BM_$P_2$, and a spacing CF_$P_{2y}$ between adjacent second alignment marks of the N second color film layer alignment marks $CF_{21}$-$CF_{2N}$ in the direction perpendicular to the first line $X_{BM1}$ is P.

For example, in a case that the first spacing BM_$P_1$ shown in FIG. 9A is equal to 1.5 mm, CF_$P_{1x}$=BM_$P_1$=1.5 mm and CF_$P_{1y}$=P; and CF_$P_{2x}$=BM_$P_2$=1.5 mm+n×3P and CF_$P_{2y}$=P. Similarly, if it is ensured that 0.4 mm<n×3P<1.1 mm, it can implement the embodiments of the present disclosure better.

Figure 10:
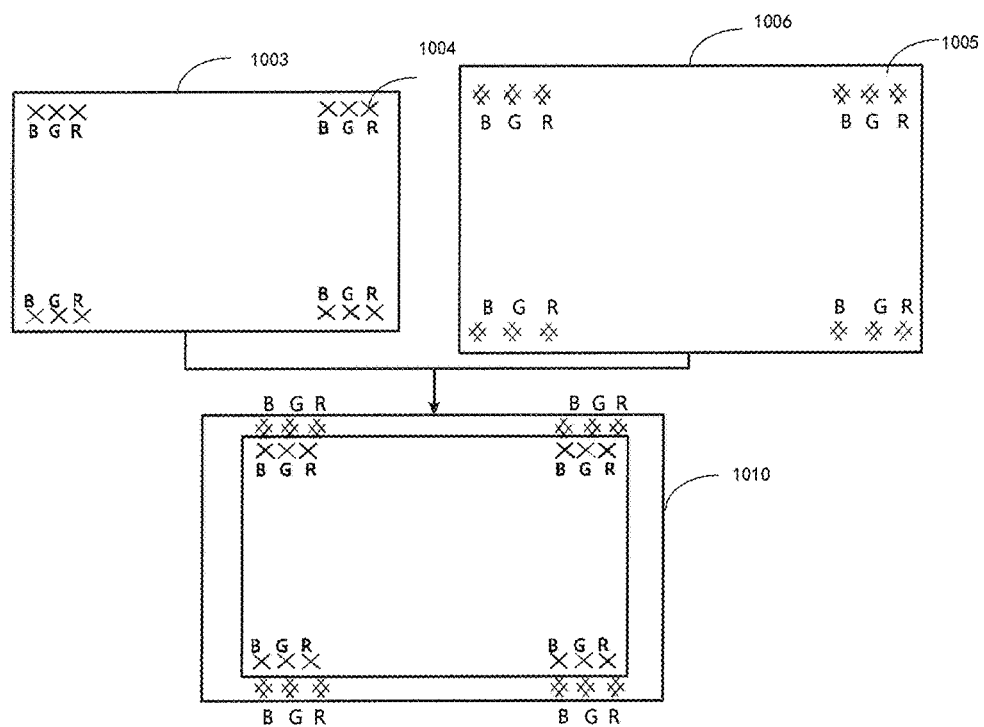
FIG. 10 illustrates a diagram of a display substrate according to an embodiment of the present disclosure.

According to the embodiments of the present disclosure, there is also provided a display substrate according to an embodiment of the present disclosure. FIG. 10 illustrates a diagram of a display substrate 1010 according to an embodiment of the present disclosure. It should be noted that FIG. 10 schematically illustrates only a display substrate according to an embodiment of the present disclosure. As the substrate is to be cut in a process, various alignment marks shown in FIG. 10 may not be present in a display substrate which is practically formed.

As shown in FIG. 10, the display substrate 1010 according to an embodiment of the present disclosure may comprise:
a black matrix 1003 having a plurality of black matrix alignment marks 1004 arranged thereon; and
a color film layer 1006 formed on the black matrix 1003 by aligning the black matrix alignment marks with associated color film layer alignment marks 1005 on a color film mask respectively.

Each end of an edge on one side of the black matrix has a group of N first black matrix alignment marks arranged thereon, and a spacing between adjacent black matrix alignment marks is a first spacing; each end of an edge on the opposing side of the black matrix has a group of N second black matrix alignment marks arranged thereon, and a spacing between adjacent second black matrix alignment marks is a second spacing different from the first spacing; and various groups of first color film layer alignment marks are associated with various groups of first black matrix alignment marks respectively, and various groups of second color film layer alignment marks are associated with various groups of second black matrix alignment marks respectively, where N is an integer greater than 1. It should be noted that a relative positional relationship of the various marks in FIG. 10 is only illustrative. It will be appreciated by those skilled in the art that the relative positional relationship of the black matrix alignment marks and the color film layer alignment marks according to the embodiment of the present disclosure described with reference to FIGS. 9A to 9C can be applied to the display substrate according to an embodiment of the present disclosure.

Figure 11A:
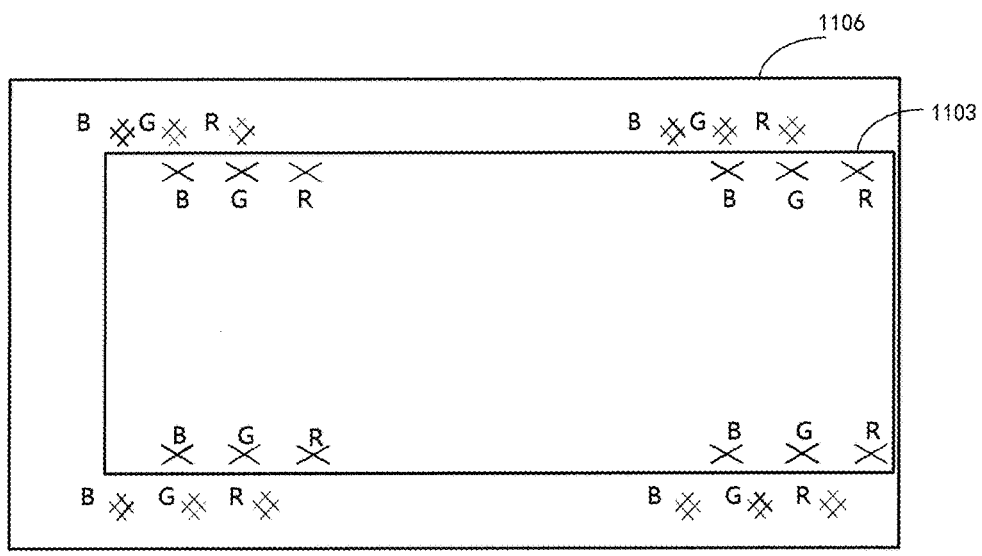
FIG. 11A illustrates a first exemplary diagram showing a case in which color film layer alignment marks are not aligned with black matrix alignment marks according to an embodiment of the present disclosure.
Figure 12A:
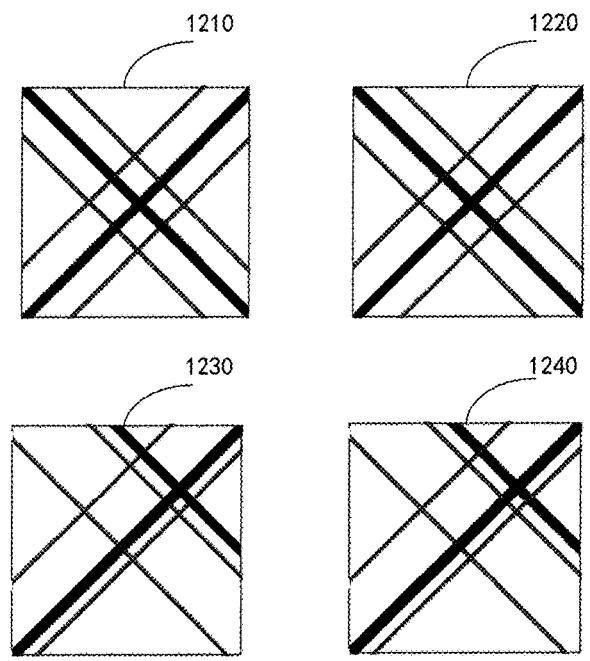
FIG. 12A illustrates a display example in the case shown in FIG. 11A according to an embodiment of the present disclosure.

FIG. 11A illustrates a first exemplary diagram showing a case in which color film layer alignment marks are not aligned with black matrix alignment marks according to an embodiment of the present disclosure. FIG. 11A corresponds to the case shown in FIG. 2, that is, if the offset of the transparent substrate is exactly one or two times the spacing of black matrix alignment marks in the process of initial alignment of the transparent substrate, the alignment offset cannot be monitored by the sensor. In this case, the pattern of the black matrix formed on the transparent substrate and the black matrix alignment marks also have an overall offset relative to normal positions. In the case shown in FIG. 11A, the black matrix alignment marks on the substrate 1103 have an overall offset of, for example, one alignment mark. Unlike the conventional technique shown in FIG. 7C, the relative positions of the color film layer alignment marks on the mark 1106 for the color film layer and the black matrix alignment marks on the substrate 1103 are set according to the embodiments of the present disclosure. For example, in the example of FIG. 11A, in a case that the positions of the black matrix alignment marks are set with reference to FIG. 9A and the sub-pixels are sequentially arranged in the lateral direction of the display substrate, the relative positions of the color film layer alignment marks are set with reference to FIG. 9B. According to the embodiments of the present disclosure, although the black matrix alignment marks have an overall offset of one alignment mark on one side of the black matrix (for example, an upper side of FIG. 11A), and therefore the alignment marks R of the color film layer appear to be aligned with the black matrix alignment marks G, the alignment marks R of the color film layer are not aligned with the black matrix alignment marks G on the opposing side of the black matrix (for example, a lower side of FIG. 11A). The exposure device may display a display example as shown in FIG. 12A. For example, by taking alignment marks for red (R) sub-pixels as an example, pictures 1210, 1220, 1230 and 1240 respectively show cases in which four R color film layer alignment marks at four corners of a mask for the color film layer are aligned with associated black matrix alignment marks. As shown in FIG. 12A, although in the two pictures 1210 and 1220 corresponding to the alignment marks on the upper side of FIG. 11A in the display example, the color film layer alignment marks appear to be aligned with the black matrix alignment marks (actually, the alignment marks R of the color film layer are erroneously aligned with the black matrix alignment marks G), in the two pictures 1230 and 1240 corresponding to the alignment marks on the lower side of FIG. 11A, it is clearly shown that the black matrix alignment marks are not aligned with the color film layer alignment marks. Thereby, the exposure device raises an alarm so that the alignment error can be corrected. In a case that the first spacing $BM\_P_1$ is equal to 1.5 mm, for example, the second spacing $BM\_P_2$ may be between 1.9 mm and 2.6 mm.

Figure 11B:
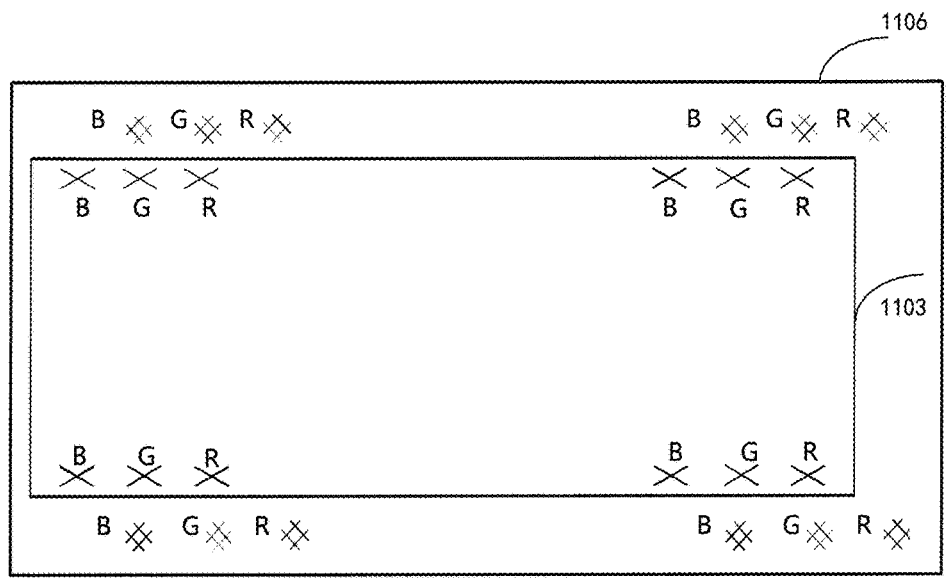
FIG. 11B illustrates a second exemplary diagram showing a case in which color film layer alignment marks are not aligned with black matrix alignment marks according to an embodiment of the present disclosure.

FIG. 11B illustrates a second exemplary diagram showing a case in which color film layer alignment marks are not aligned with black matrix alignment marks according to an embodiment of the present disclosure. FIG. 11B illustrates a case that alignment marks have an overall offset of one alignment mark which corresponds to FIG. 7D. Unlike the conventional technique shown in FIG. 7D, the relative positions of the color film layer alignment marks on the mark 1106 for the color film layer and the black matrix alignment marks on the substrate 1103 are set according to the embodiments of the present disclosure. For example, in the example of FIG. 11B, in a case that the positions of the black matrix alignment marks are set with reference to FIG. 9A and the sub-pixels are sequentially arranged in the lateral direction of the display array, the relative positions of the color film layer alignment marks are set with reference to FIG. 9B. According to the embodiments of the present disclosure, although the black matrix alignment marks have an overall offset of one alignment mark on one side of the black matrix (for example, an upper side of FIG. 11B), and therefore the alignment marks B of the color film layer are aligned with the black matrix alignment marks G, the alignment marks B of the color film layer are not aligned with the black matrix alignment marks G on the opposing side of the black matrix (for example, a lower side of FIG. 11 B). The exposure device may display a display example as shown in FIG. 12B. For example, by taking alignment marks for blue (B) sub-pixels as an example, pictures 1210', 1220', 1230' and 1240' respectively show cases in which four alignment marks B of a color film layer at four corners of a mask for the color film layer are aligned with associated black matrix alignment marks. As shown in FIG. 12B, although in the two pictures 1210' and 1220' corresponding to the upper side of FIG. 11B in the display example, the color film layer alignment marks appear to be respectively aligned with the black matrix alignment marks (actually, the alignment marks B of the color film layer are erroneously aligned with the black matrix alignment marks G), in the two pictures 1230' and 1240' corresponding to the lower side of FIG. 11B, it is shown that the alignment marks B of the color film layer are not aligned with the black matrix alignment marks G. Thereby, the exposure device raises an alarm so that the alignment error can be corrected.

Figure 11C:
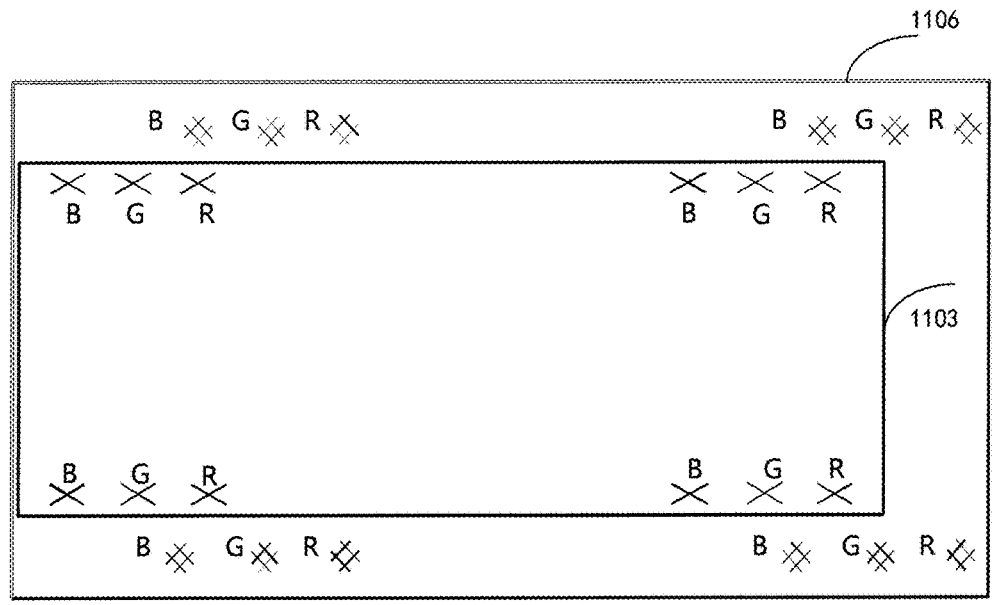
FIG. 11C illustrates a third exemplary diagram showing a case in which color film layer alignment marks are not aligned with black matrix alignment marks according to an embodiment of the present disclosure.
Figure 12B:
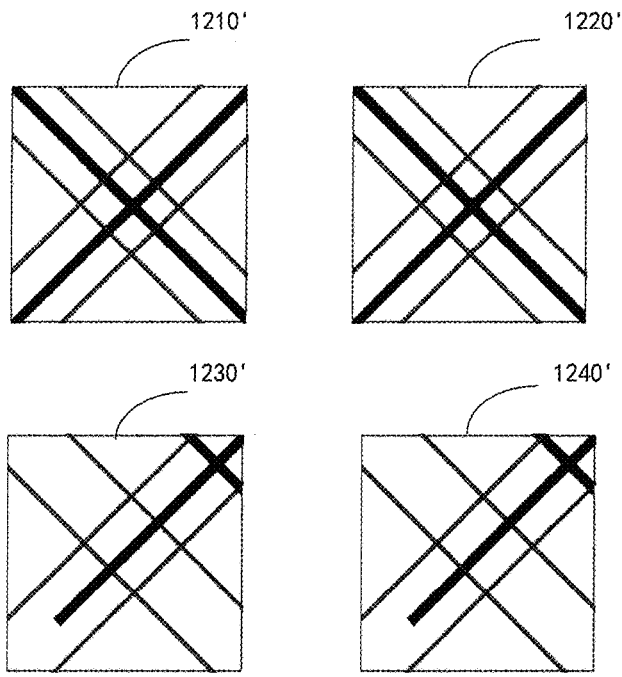
FIG. 12B illustrates a display example in the case shown in FIG. 11B according to an embodiment of the present disclosure.
Figure 12C:
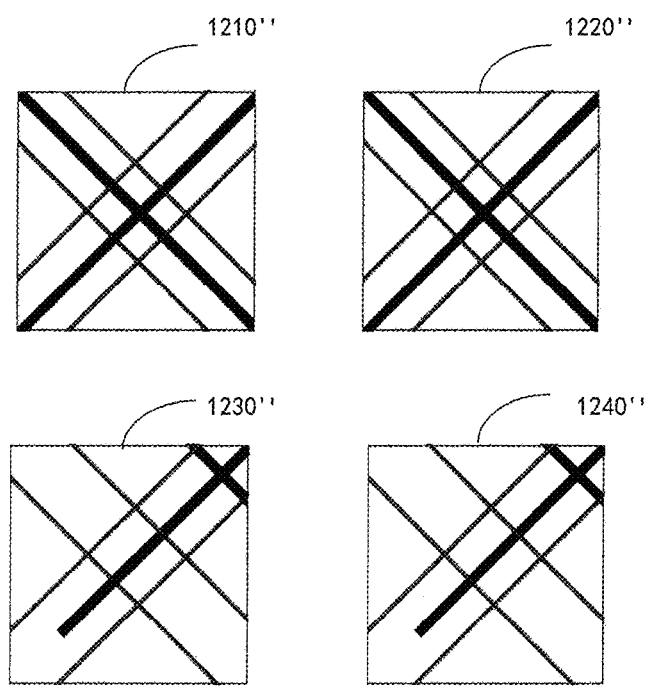
FIG. 12C illustrates a display example in the case shown in FIG. 11C according to an embodiment of the present disclosure.

FIG. 11C illustrates a third exemplary diagram showing a case in which color film layer alignment marks are not aligned with black matrix alignment marks according to an embodiment of the present disclosure. FIG. 11C illustrates a case that alignment marks have an overall offset of two alignment marks which corresponds to FIG. 7E. Unlike the conventional technique shown in FIG. 7E, the relative positions of the color film layer alignment marks on the mark 1106 for the color film layer and the black matrix alignment marks on the substrate 1103 are set according to the embodiments of the present disclosure. For example, in the example of FIG. 11C, in a case that the positions of the black matrix alignment marks are set with reference to FIG. 9A and the sub-pixels are sequentially arranged in the lateral direction of the display substrate, the relative positions of the color film layer alignment marks are set with reference to FIG. 9B. According to the embodiments of the present disclosure, although the black matrix alignment marks have an overall offset of two alignment marks on one side of the black matrix (for example, an upper side of FIG. 11C), and therefore the alignment marks B of the color film layer are aligned with the black matrix alignment marks R, the alignment marks B of the color film layer are not aligned with the black matrix alignment marks R on the opposing side of the black matrix (for example, a lower side of FIG. 11C). The exposure device may display a display example as shown in FIG. 12C. For example, by taking alignment marks for blue (B) sub-pixels as an example, pictures 1210", 1220", 1230" and 1240" respectively show cases in which four alignment marks B of a color film layer at four corners of a mask for the color film layer are aligned with black matrix alignment marks. As shown in FIG. 12C, although in the two pictures 1210" and 1220" corresponding to the upper side of FIG. 11C in the display example, the black matrix alignment marks appear to be respectively aligned with the color film layer alignment marks (actually, the alignment marks B of the color film layer are erroneously aligned with the black matrix alignment marks R), in the two pictures 1230" and 1240" corresponding to the lower side of FIG. 11C, it is clearly shown that the alignment marks B of the color film layer are not aligned with the black matrix alignment marks R. Thereby, the exposure device raises an alarm so that the alignment error can be corrected.

It will be understood by those skilled in the art that although the above examples have been described by way of example in which the sub-pixels are sequentially arranged in the lateral direction of the display substrate, according to the forgoing description, the embodiments of the present disclosure can be easily applied to a case that the sub-pixels are sequentially arranged in the longitudinal direction of the display substrate.

The embodiments of the present disclosure further provide a display panel, comprising an array substrate and the display substrate according to an embodiment of the present disclosure as described above.

The embodiments of the present disclosure further provide a display apparatus, comprising the display panel according to an embodiment of the present disclosure described above. The display apparatus may be, but is not limited to, any product or component having a display function such as an electronic paper, a mobile phone, a tablet computer, a television set, a display, a notebook computer, a digital photo frame, a navigator, etc.

According to the embodiments of the present disclosure, the first spacing between adjacent alignment marks of the first black matrix alignment marks on one side of the black matrix is set to be different from the second spacing between adjacent alignment marks of the second black matrix alignment marks on the opposite side of the black matrix, and the color film layer alignment marks are set in association therewith, so that a case of erroneous automatic alignment does not occur even if there is a alignment offset of one or two alignment marks.

While the present disclosure has been specifically shown and described with reference to typical embodiments of the present disclosure, it will be understood by those of ordinary skill in the art that various changes can be made to these embodiments in form and detail without departing from the spirit and scope of the present disclosure defined by the appended claims.

We claim:

1. A method for manufacturing a display substrate, comprising:
    forming a black matrix and a plurality of black matrix alignment marks;
    providing a color film mask having a plurality of color film layer alignment marks associated with the plurality of black matrix alignment marks respectively; and
    forming a color film layer on the black matrix by aligning the black matrix alignment marks with associated color film layer alignment marks respectively,
    wherein each end of an edge on one side of the black matrix has a group of N first black matrix alignment marks formed thereon, and a spacing between adjacent first black matrix alignment marks is a first spacing; and each end of an edge on the opposing side of the black matrix has a group of N second black matrix alignment marks formed thereon, and a spacing between adjacent second black matrix alignment marks is a second spacing that is different from the first spacing, where N is an integer greater than 1.

2. The method according to claim 1, wherein a center of each group of N first black matrix alignment marks is located in a first line, a center of each group of N second black matrix alignment marks is located in a second line, and the second spacing is equal to the first spacing plus n×3P, where n is a positive integer, and P is a spacing between central lines of adjacent sub-pixels.

3. The method according to claim 2, wherein a spacing between adjacent first color film layer alignment marks is the first spacing plus P or the first spacing minus P; and a spacing between adjacent second color film layer alignment marks is the second spacing plus P or the second spacing minus P.

4. The method according to claim 3, wherein the first spacing is equal to 1.5 mm, and 0.4 mm<n×3P<1.1 mm.

5. The method according to claim 2, wherein a spacing between adjacent first color film layer alignment marks in a direction of the first line is the first spacing, and a spacing between adjacent first color film layer alignment marks in a direction perpendicular to the first line is P; and a spacing between adjacent second color film layer alignment marks in the direction of the first line is the second spacing, and a spacing between adjacent second color film layer alignment marks in the direction perpendicular to the first line is P.

6. The method according to claim 5, wherein the first spacing is equal to 1.5 mm, and 0.4 mm<n×3P<1.1 mm.

7. The method according to claim 2, wherein the first spacing is equal to 1.5 mm, and 0.4 mm<n×3P<1.1 mm.

8. A display substrate, comprising:
    a black matrix having a plurality of black matrix alignment marks arranged thereon; and
    a color film layer formed on the black matrix by aligning the black matrix alignment marks with associated color film layer alignment marks on a color film mask respectively,
    wherein each end of an edge on one side of the black matrix has a group of N first black matrix alignment marks arranged thereon, and a spacing between adjacent first black matrix alignment marks is a first spacing; and each end of an edge on the opposing side of the black matrix has a group of N second black matrix alignment marks arranged thereon, and a spacing between adjacent second black matrix alignment marks is a second spacing that is different from the first spacing, where N is an integer greater than 1.

9. The display substrate according to claim 8, wherein a center of each group of N first black matrix alignment marks is located in a first line, a center of each group of N second black matrix alignment marks is located in a second line, and the second spacing is equal to the first spacing plus n×3P, where n is a positive integer, and P is a spacing between central lines of adjacent sub-pixels.

10. The display substrate according to claim 9, wherein a spacing between adjacent first color film layer alignment marks is the first spacing plus P or the first spacing minus P; and a spacing between adjacent second color film layer alignment marks is the second spacing plus P or the second spacing minus P.

11. The display substrate according to claim 10, wherein the first spacing is equal to 1.5 mm, and 0.4 mm<n×3P<1.1 mm.

12. A display panel, comprising an array substrate and the display substrate according to claim 10.

13. The display substrate according to claim 9, wherein a spacing between adjacent first color film layer alignment marks in a direction of the first line is the first spacing, and a spacing between adjacent first color film layer alignment marks in a direction perpendicular to the first line is P; and a spacing between adjacent second color film layer alignment marks in the direction of the first line is the second spacing, and a spacing between adjacent second color film layer alignment marks in the direction perpendicular to the first line is P.

14. The display substrate according to claim 13, wherein the first spacing is equal to 1.5 mm, and 0.4 mm<n×3P<1.1 mm.

15. A display panel, comprising an array substrate and the display substrate according to claim 13.

16. The display substrate according to claim 9, wherein the first spacing is equal to 1.5 mm, and 0.4 mm<n×3P<1.1 mm.

17. A display panel, comprising an array substrate and the display substrate according to claim 16.

18. A display panel comprising an array substrate and the display substrate according to claim 9.

19. A display panel, comprising an array substrate and the display substrate according to claim 8.

20. A display apparatus, comprising the display panel according to claim 19.

* * * * *